July 21, 1936.    W. S. FREES    2,047,958
SELF ADJUSTING TREE SHIELD
Filed June 3, 1935
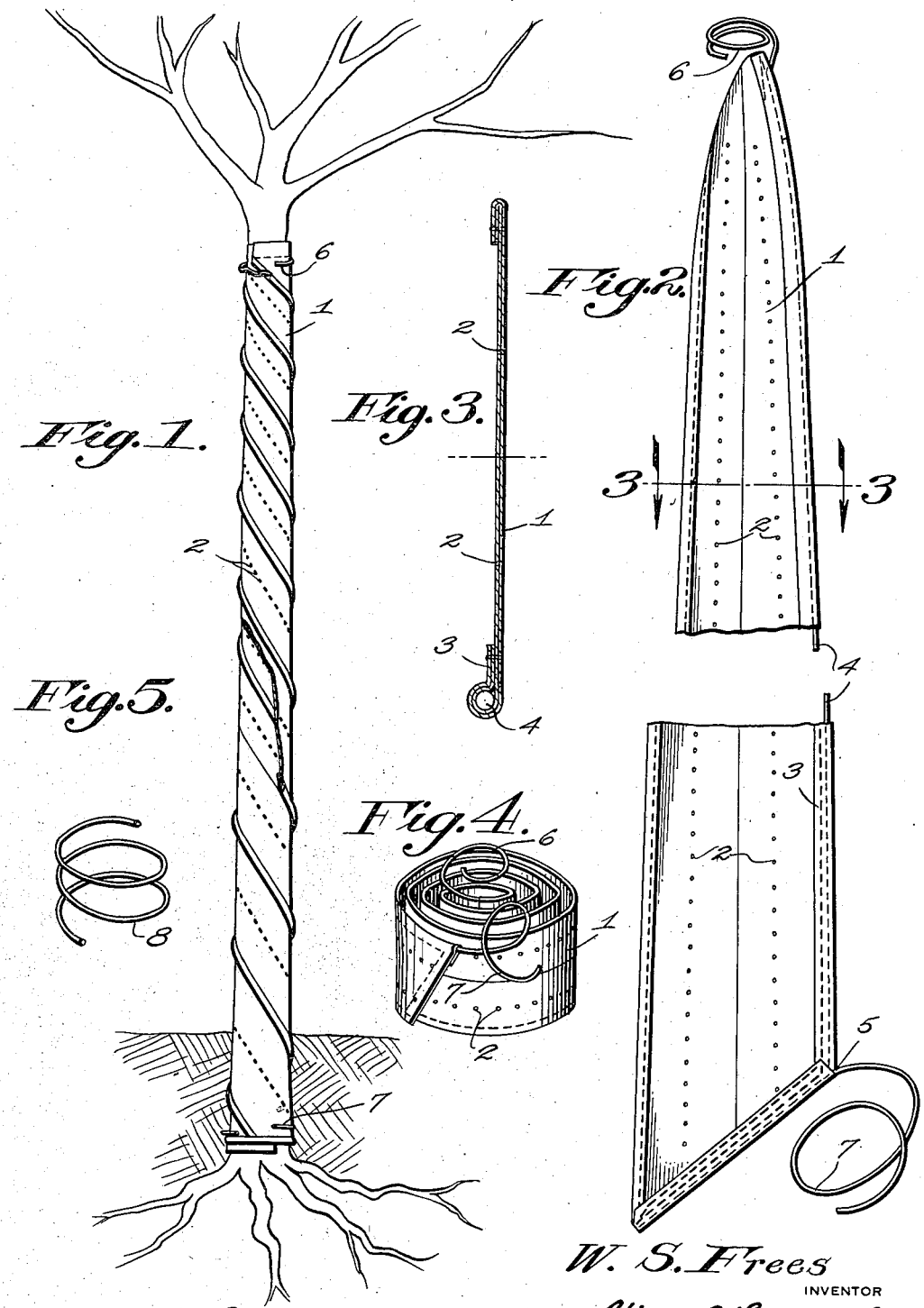
W. S. Frees
INVENTOR Patented July 21, 1936

2,047,958

UNITED STATES PATENT OFFICE 2,047,958

SELF-ADJUSTING TREE SHIELD

Willis S. Frees, Garrettsville, Ohio

Application June 3, 1935, Serial No. 24,743

3 Claims. (Cl. 47—23)

This invention relates to self-adjusting shields for trees and has for the primary object the provision of a device of this character which may be readily adapted to trunks of young trees to afford protection thereto against weather conditions, animals, insects and the like and which frequently attack trees, causing damage thereto, many times resulting in the death of the tree.

Another object of this invention is the provision of a device of the above stated character which may be readily adjusted to trees of different sizes and shapes and when applied to a tree of a size will be self-adjusting or expandible to take care of the growth of the tree so as not to interfere or bind and injure the tree and will permit ventilation to the tree or the part covered and protected by the device.

With these and other objects in view, this invention consists in certain novel features of construction, combination and arrangement of parts to be hereinafter more fully described and claimed.

For a complete understanding of my invention, reference is to be had to the following description and accompanying drawing, in which—

Figure 1 is a side elevation, illustrating a shield constructed in accordance with my invention and showing the same applied to a tree.

Figure 2 is a plan view showing the shield in its unfolded condition.

Figure 3 is a sectional view taken on the line 3—3 of Figure 2.

Figure 4 is a perspective view showing the shield in form prior to its application to a tree.

Figure 5 is a perspective view showing a modified form of securing means for the shield to a tree.

Referring in detail to the drawing, the numeral 1 indicates a shield constructed of any material suitable for the purpose and capable of being spirally wound onto a trunk of a tree so that the spirals overlap one another with the ends of the shield snugly fitting the tree permitting the shield to form a full protection for the trunk for the purpose of excluding weather elements and also for protecting the trunk against attack by animals, insects and the like. The shield when adapted to a trunk of a tree extends from a point below the surface of the ground to a point adjacent the branches of the tree, this being clearly illustrated in Figure 1. The strip of material throughout its length is provided with rows of openings or perforations 2 which will permit ventilation to the trunk of the tree or that part of the tree covered by the shield. The strip of material 1 tapers towards one end while its opposite end is cut at an angle. One side edge and the angularly cut end of the strip of material are provided with hems 3, one of which receives an element 4 while the other receives an element 5.

The elements 4 and 5 are constructed of a suitable resilient material so that said elements can be bent into a selected formation and are capable of flexing from that formation with a tendency to always assume said formation. The strip of material when applied to the trunk of a tree in spiral formation will cause the element 4 to assume a corresponding shape, that is, of spiral formation, maintaining the overlapping edges of the strip of material tightly upon each other. As the tree grows the element 4 will give or expand, allowing the spirals of the strip to increase in size to accommodate the growth of the tree. The element 5 is of a material similar to the element 4 and its action is similar to the action of the element 4. The elements 4 and 5 extend outwardly of the strip of material and are bent to form coils 6 and 7. The coils 6 and 7 act to secure the ends of the strip of material on the trunk of the tree when said strip of material has been applied to the tree in spiral formation, thereby keeping the ends of the shield snugly against the trunk of the tree.

If desired, spirals 8 may be employed for securing the ends of the shield to the trunk of the tree, one of these spirals being clearly shown in Figure 5, and may be readily placed on the tree over the ends of the spirally formed strip of material to efficiently secure the shield in position and permit the material of the shield to unwind with the growth of the tree so that the shield will at no time bind or hinder the growth of the tree.

A device of the character described and shown in the drawing may be easily and quickly applied to a tree and removed therefrom as desired and will not interfere with the growth of the tree while affording protection thereto. The elements 4 and 5 within the hems of the strip of material will provide to the latter when in spiral formation upon the trunk of a tree, barriers at the overlapping edges of the spirals of the material. These barriers aid in preventing insects from crawling under the overlapping edges of the spirals and thereby prevent entrance of the insects to the interior of the shield or to the part of the tree covered by the shield.

Having described the invention, I claim:

1. A shield for trees comprising a protecting strip wrapped about a trunk of a tree in spiral formation with the spirals thereof arranged in overlapped relation, elements secured to one end and one edge of the strip of material and adapted to conform to the contour of the tree during the wrapping of the strip of material to the tree in spiral formation.

2. A shield for trees comprising a protecting strip wrapped about a trunk of a tree in spiral formation with the spirals thereof arranged in overlapped relation, elements secured to one end and one edge of the strip of material and adapted to conform to the contour of the tree during the wrapping of the strip of material to the tree in spiral formation, said metallic members having portions thereof bent into coiled formation to surround the tree and the strip of material at the ends thereof.

3. A shield for trees comprising a protecting strip wrapped about a trunk of a tree in spiral formation with the spirals thereof arranged in overlapped relation, resilient elements secured to one end and one edge of the strip of material and adapted to conform to the contour of the tree during the wrapping of the strip of material to the tree in spiral formation, said metallic members having portions thereof bent into coiled formation to surround the tree and the strip of material at the ends thereof, said strip of material having rows of perforations to admit air to the tree for ventilation purposes.

WILLIS S. FREES.